Jan. 4, 1938.　　　P. F. PUTNEY　　　2,104,623
CARAMEL CUTTING MACHINE
Filed June 12, 1935
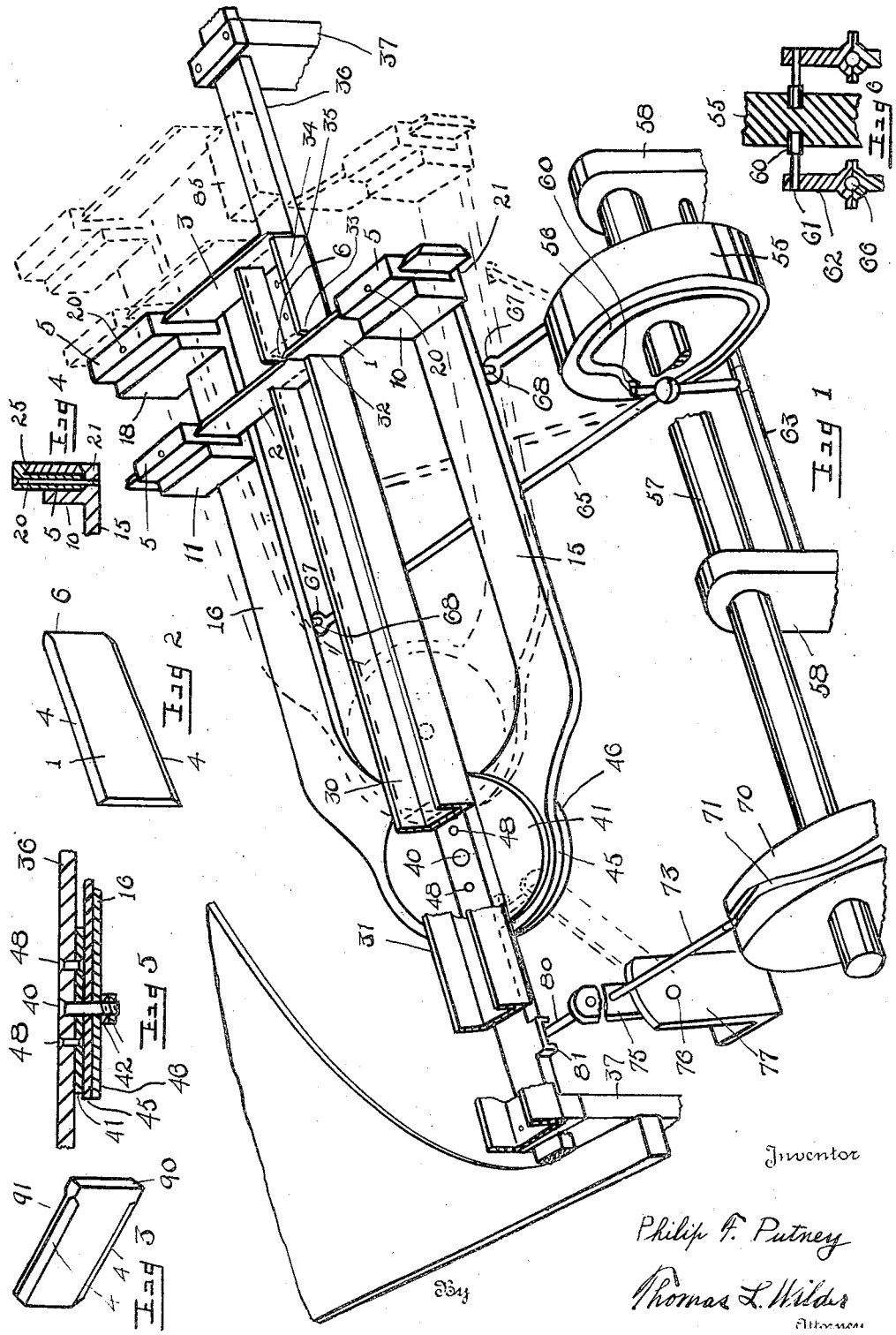
Inventor
Philip F. Putney
Thomas L. Wilder
Attorney Patented Jan. 4, 1938

2,104,623

UNITED STATES PATENT OFFICE 2,104,623

CARAMEL CUTTING MACHINE

Philip F. Putney, Newport, N. Y.

Application June 12, 1935, Serial No. 26,254

4 Claims. (Cl. 107—21)

My invention relates to a caramel cutting machine and I declare the following to be a full, clear, concise and exact description thereof sufficient to enable anyone skilled in the art to which it appertains to make and use the same, reference being had to the accompanying drawing in which like reference characters refer to like parts throughout the specification.

The object of the invention is to provide a candy caramel cutting machine that will be free from the objectionable feature heretofore experienced namely of the candy sticking to the sides of the knife blades and thereby gumming the same to such an extent as to interfere with the normal running of the machine and also causing frequent stopping of the machine for the purpose of cleaning the knives.

The above objectionable feature is overcome in the present invention by the use of copper plated steel knives or by plating with any nonferrous metal such as aluminum, brass or the like metals.

The object will be understood by referring to the drawing in which:

Fig. 1 is a perspective view, parts broken away showing the candy cutting machine.

Fig. 2 is a detail view showing one of the knives employed.

Fig. 3 is a detail view showing a modification of one of the knives employed.

Fig. 4 is a detail enlarged view showing a central vertical section of one of the knife holding members.

Fig. 5 is a central vertical section taken on line 5—5 of Fig. 1, parts being broken away.

Fig. 6 is a sectional view taken on the line 6—6 of Fig. 1, parts being broken away.

Referring more particularly to the drawing, the candy caramel cutting machine embodies the cutting knives 1 and 2 and the caramel separating knife 3. Each of the knives, 1, 2 and 3 is rectangular in shape and has beveled upper and lower edges 4, 4, to fit in a removable manner into corresponding grooves made in the knife clamping member 5 hereinafter described. Furthermore, each of the said knives are of the same thickness from end to end and is brought to a knife cutting edge at 6.

Moreover, each of the knives is made of steel and copper plated. The copper plate has been found to allow the knife to pass through the candy without said candy sticking or in any manner adhering to the sides of the knife, thereby overcoming the objectionable feature hereinabove mentioned.

It is essential that a copper plated steel knife be used; copper alone is too soft for the purpose.

Each of the cutting knives 1 and 2 is removably held in cutting position by an L shaped holding member 10 in one instance and 11 in the other. Holding member 10 is formed integral, brazed or otherwise fastened to the end of rock arm 15, whereas holding member 11 is formed integral, brazed to the upper surface of cooperative rock arm 16. Holding member 18 is likewise formed or mounted to the end of arm 16.

An auxiliary clamping member 5 is used in connection with each of the holding members 10, 11 and 18. It is secured to said members by a screw bolt 20 that projects therethrough and engages a threaded aperture in the base part 21 of each of said holders 10, 11 and 18. The upper part of auxiliary clamping member 5 is provided with a beveled groove 25 to conform to the beveled upper edge of knives 1, 2 and 3. The lower beveled edge 4 of each of said knives rests in corresponding beveled grooves in base part 21 of L shaped members 10, 11 and 18. Clamping members 5 will hold knives 1, 2 and 3 rigidly in removable position, whereby to withstand any strain thereon occasioned by cutting the candy caramel 30 represented by dotted lines in Fig. 1 as it passes along caramel chute 31.

Caramel chute is channel shaped and ends adjacent the location of cutting knives 1 and 2, whereby to allow for a slight lateral swing of the free ends of cutting knives 1 and 2 between said end 32 of chute 31 and the contiguous end 33 of auxiliary chute 34.

Auxiliary chute 34 is fastened by bolts 35, 35 to movable knife bar 36. The heads of bolts 35, 35 are countersunk in the surface of chute 34 to effect a smooth upper surface thereof.

The parts of the machine immediately connected with the cutting knives 1 and 2 and separating knife 3 embody the said movable knife bar 36 which is mounted to slide in guide posts 37, 37 fixed to the stationary part of the machine.

Rock arms 15 and 16 are pivoted at 40 to movable knife bar 36 and move therewith. The upper head of pivot bolt 40 is countersunk to bar 36. It projects down through a washer 41 and is secured on its lower end by lock nuts 42, 42. Washer 41 is fastened to the under surface of bar 36 and lies between the upper surface of enlarged part 45 of arm 15 and the under surface of bar 36. Bar 16 is also enlarged at 46 and rests beneath enlarged part 45 of arm 15. Washer 41 is fastened to knife bar 36 by countersunk bolts 48, 48.

Caramel chute 31 is held stationary above knife bar 36 by one of the posts 37.

The means for rocking bars 15 and 16 on pivot 40 as a fulcrum embodies a cam 55 having cam grooves 56, 56 in opposite sides of its lateral faces. Cam 55 is mounted to turn with shaft 57 carried in loose bearings formed in upright supports 58, 58 secured at their bases to a stationary part of the machine.

Rollers 60, 60 engage cam grooves 56, 56 and are supported in each instance on studs 61, 61 in upright rocker arms 62, 62. The lower ends of rocker arms 62, 62 are swiveled on shaft 63 carried in bearings in supports 58, 58.

Each of the connecting rods 65, 65 is joined at one end by a ball and socket joint 66 to upright rocker arm 62 and at the other by a loose or pivoted joint 67 to the lower end of depending bolt 68, that in each instance is screw mounted to and projects through the rock arms 15 and 16.

The means for moving the cut caramel forwards towards the paper winding wrapping machine, not shown, embodies cam 70 having a cam groove 71 formed in its circumferential or peripheral surface. Cam 70 is mounted to turn with shaft 57.

A roller is mounted on the free end of a straight shaft 73 and fits in cam groove 71. The opposite end of shaft 73 is rigidly fixed to rock member 75. Rock member 75 is pivoted at 76 to upstanding bracket 77 fixed to a stationary part of the machine.

A second straight shaft 80 is also rigidly fixed to the upper part of rock member 75 and above the location of the bearing of shaft 73. The free end of shaft 80 has a loose fit in the inverted U member 81 formed integral with the lateral edge of knife bar 36.

Straight shaft 73 is located below straight shaft 80, whereby to step up or increase the throw of cam 70.

In operation the strip of candy shown by dotted line 30 in Fig. 1 is passed along chute 31 until it reaches knives 1 and 2 which are actuated inward by cam 55, whereby to cut the strip at proper lengths. Likewise, separating knife 3 is moved inward simultaneously with knives 1 and 2 to engage the cut previously made in the strip and by moving through said cut sever the cut caramel 85 from those approaching from knives 1 and 2. This is possible because knife 3 is mounted on the end of arm 16.

While knives 1, 2 and 3 are in the cutting position they are moved to the right to push the separated caramels and the one just cut towards the paper wrapping machine, not shown. At the end of this stroke, cam 55 actuates knives 1, 2 and 3 to open or dotted line position illustrated in Fig. 1 and thereafter cam 70 actuates them back to original position with knives 1, 2 and 3 still open. Whereupon, the several operations are repeated to cut, sever and advance another caramel.

The modification illustrated in Fig. 3 shows a knife having a flat surface to cooperate with knife such as 1, 2 or 3 having a sharp edge 6. In this instance the sharp edge 6 will abut against the flat edge 90 of knife 91 for cutting purposes.

Having thus described my invention what I claim as new and desire to secure by Letters Patent is as follows:

1. In a caramel cutting machine, knives for cutting candy caramels and a copper plated coating applied to said knives, whereby to prevent the candy sticking thereto.

2. In a caramel cutting machine, knives for cutting the strip of candy and said knives being plated with a nonferrous metal to prevent the candy from sticking thereto.

3. In a caramel cutting machine, knives having beveled edges whereby to aid in retaining the same in position and said knives being copper plated, whereby to prevent the caramel sticking thereto.

4. In a caramel cutting machine, rectangular shaped knives, said knives having beveled edges whereby to aid in holding them in assembled position and a copper plating covering the surface of said knives, whereby to prevent the caramel adhering thereto.

PHILIP F. PUTNEY.